United States Patent [19]

Jensen

[11] 4,313,454
[45] Feb. 2, 1982

[54] HYDRAULIC BRAKE BOOSTER PRESSURE LIMITER

[75] Inventor: Kenneth D. Jensen, Owosso, Mich.

[73] Assignee: Midland-Ross Corporation, Cleveland, Ohio

[21] Appl. No.: 102,884

[22] Filed: Dec. 12, 1979

[51] Int. Cl.³ .................. G05D 11/02; B60T 13/12
[52] U.S. Cl. ................................. 137/101; 91/532
[58] Field of Search ............... 137/101; 92/516, 517, 92/532; 60/548; 91/391 R

[56] References Cited
U.S. PATENT DOCUMENTS

| | | | |
|---|---|---|---|
| 3,603,209 | 9/1971 | MacDuff | 91/391 |
| 3,728,942 | 4/1973 | Brown, Jr. | 91/469 |
| 3,796,134 | 3/1974 | Kaptrosky | 91/418 |
| 3,845,693 | 11/1974 | Meyers | 91/371 |
| 4,072,011 | 2/1978 | Ewald | 60/548 X |
| 4,130,990 | 12/1978 | Amedei et al. | 60/548 X |
| 4,161,867 | 7/1979 | Adachi | 60/548 X |

Primary Examiner—William R. Cline
Attorney, Agent, or Firm—Richard A. Negin

[57] ABSTRACT

The present invention is a pressure limiter for a hydraulic booster. The pressure limiter adjusts and limits the pressure generated between a pumping means and a restricting gap in a gain valve by limiting the size of the gap in response to sensed system pressure. A pressure limiter piston responds to system pressure to act against a gain valve piston and control the size of the gain valve gap.

21 Claims, 5 Drawing Figures

HYDRAULIC BRAKE BOOSTER PRESSURE LIMITER

BACKGROUND OF THE INVENTION

The present invention is in the field of hydraulic boosters; more particularly, the invention relates to a pressure limiter for use with hydraulic boosters.

The use of pressure limiting devices in hydraulic boosters is known in the art. As shown by U.S. Pat. Nos. 3,728,942; 3,845,693 and 3,796,134, means are provided to limit the pressure below a predetermined value.

Hydraulic boosters are used to increase the pressure in the system. This increased pressure can be used, as in the case of a power braking system, to assist in braking. There are means to limit the hydraulic booster to operate below a predetermined pressure. In hydraulic boosters of the type which use demand or gain valves to restrict a fluid passage or gap, the pressure between the gap and the pumping means increases. Stops have been used to limit the amount of restriction in the gap of the gain valve and thereby limit the pressure. There must be sufficient flow through the gap for sufficient fluid for the power steering gear.

U.S. Pat. No. 3,728,942 is an example of a gain valve restriction which is limited by the action of a stop means or stem on an adjusting stud intercepting a washer on the gain valve spool or piston so that the restriction remains opened. A predetermined maximum pressure can be set by adjusting the distance between the stem and the washer.

U.S. Pat. No. 3,845,693 has a particular variation of this type of approach of limiting pressure but also assuring that the pressure limiting device will not interfere with brake pedal operation. However, there is no control over the booster pressure acting in the hydraulic booster other than to cause a predetermined limit based on the given value of the restriction opening used to create the pressure.

U.S. Pat. No. 3,796,134 has a pressure limiting means where the pressure between the pumping means and the hydraulic booster is closed above a given pressure.

Generally, prior art hydraulic booster pressures are limited based on mechanical predetermined spatial relationships within the valve to limit the pressure of a known fluid passing through the gain or demand valve. The dimensional tolerances in the prior art hydraulic boosters must be very carefully controlled. If the gap is too small, there is insufficient fluid to the power steering gear and if the gap is too large, the desired booster pressure is limited below the maximum desirable value. Prior art pressure limiters cannot compensate for pressure changes which might result through the use of fluids having different properties or for the effect of temperature changes on fluid properties.

SUMMARY OF THE INVENTION

The present invention is a pressure limiter for a hydraulic booster. The pressure limiter adjusts and limits the pressure generated between a pumping means and a restricting gap in a gain valve by limiting the size of the gap in response to sensed system pressure. Movement of the gain valve piston to restrict the gap is controlled by a pressure limiter piston which intercepts the gain valve piston. Initially, the gain valve piston can move unrestricted to close the gap upon a signal from the brake. At higher pressures, the gain valve piston directly or indirectly is intercepted by the pressure limiter piston which tends to force the gain valve piston in a direction which tends to open the valve. This effect is combined with the pressure effects of a gain valve spring means and a pressure limiter spring means to control the size of the gap based on predetermined pressure requirements. The pressure limiter spring means maintains the pressure limiter piston in a position so that the gain valve is unaffected at lower pressures. The spring size is taken into consideration with the pressure requirements to achieve the desired pressure limitation at higher pressures.

It is the object of the present invention to limit the pressure in a hydraulic booster below a predetermined pressure level by use of a pressure responsive pressure limiting feature. It is an object of the present invention to maintain normal pressure generating capabilities of the gain valve while providing the pressure limiter of the present invention. Another object of the present invention is to limit the pressure and still assure flow downstream to the power steering gear when the hydraulic booster is applied at maximum pressure. It is a further object of the present invention to limit control to the booster independently of pump relief pressure settings. It is another object of the present invention to limit the pressure in the hydraulic booster and yet not affect downstream flow design of the hydraulic booster when using fluids having different properties or fluids at different temperatures. It is another object of the present invention to provide a pressure limiter having a simple construction, minimum parts and be able to be easily designed for use in present units with little modification. It is an advantage of the present invention to limit the pressure in a hydraulic booster by the use of pressure and spring force considerations creating a gap in the gain valve rather than by designing for a predetermined size gap for an ideal fluid. It is another advantage that the tolerances required by prior art pressure limiters to obtain the predetermined gap are not required with the pressure limiter of the present invention.

It is an object of this invention to obtain one or more of the objects set forth above. These and other objects and advantages of this invention will become apparent to those skilled in the art from the following specification and claims, reference being had to the attached drawings.

DESCRIPTION OF THE PREFERRED EMBODIMENT

Figure 1:
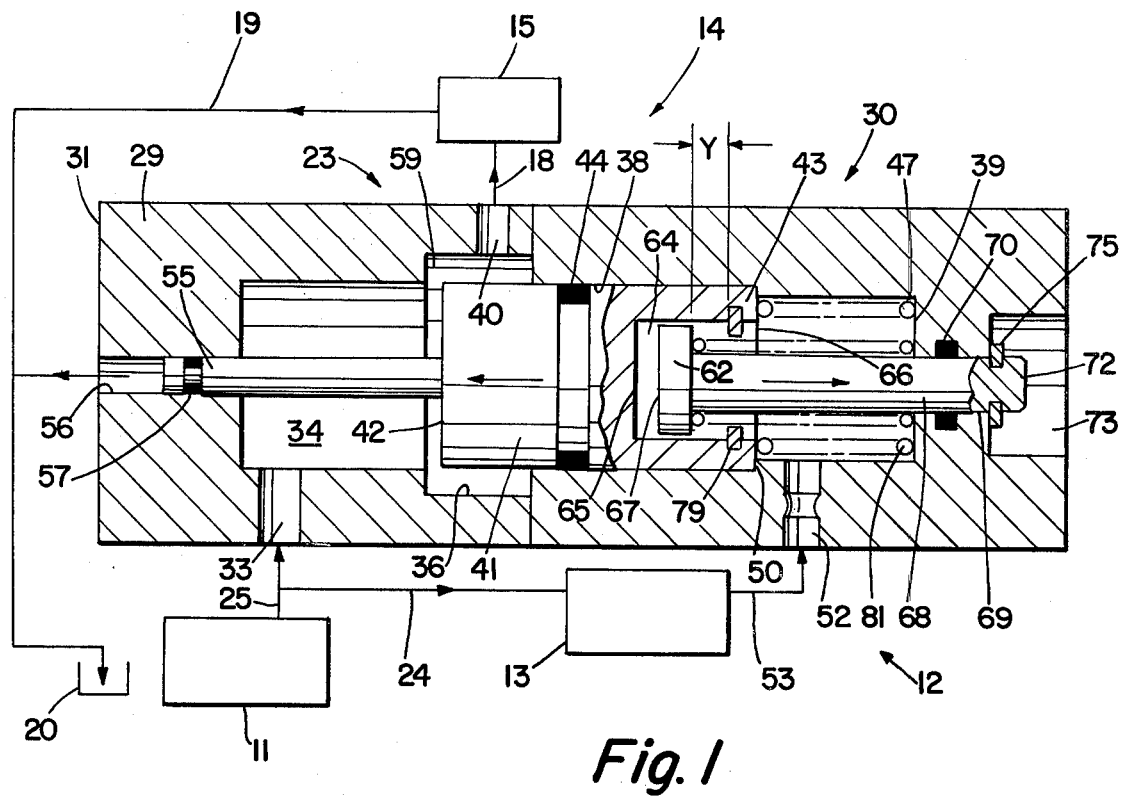
FIG. 1 is a schematic, sectional view of one embodiment of the present invention.
Figure 2:
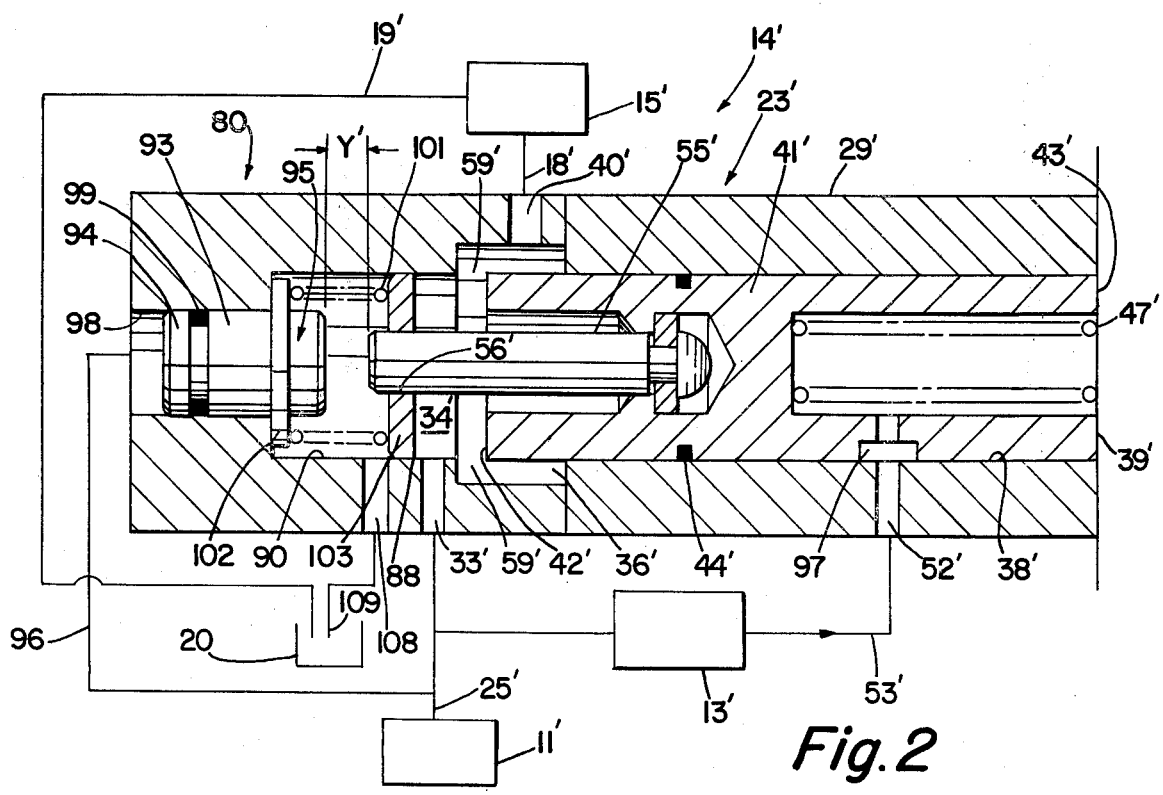
FIG. 2 is a schematic, sectional view of an alternate embodiment of the present invention without the pressure limiter engaged.
Figure 3:
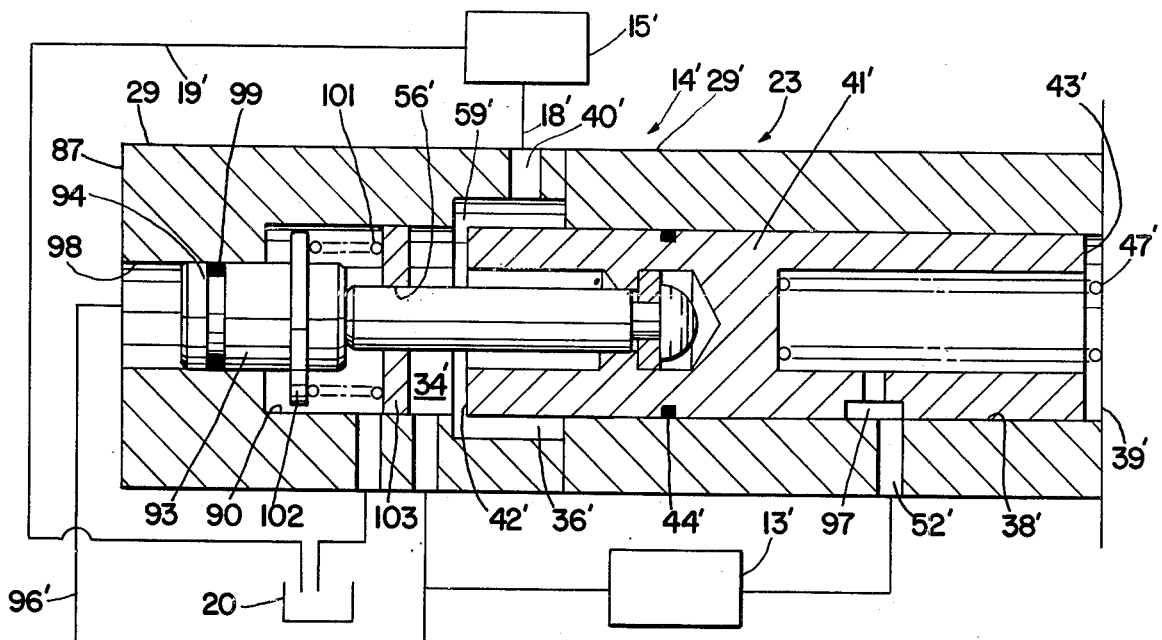
FIG. 3 is a schematic, sectional view of the embodiment shown in FIG. 2 with the pressure limiter engaged.
Figure 5:
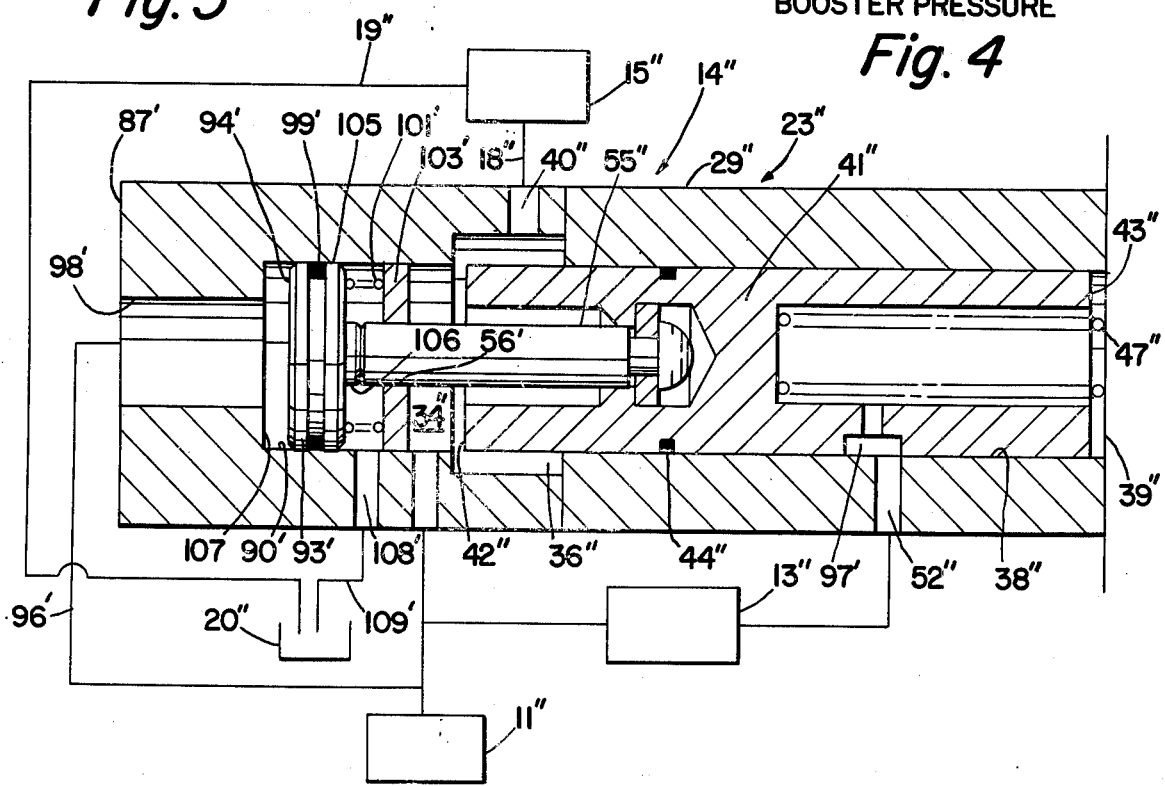
FIG. 5 is a schematic, sectional view of an alternate embodiment of the present invention.

The present invention will be understood by those skilled in the art by reference to FIG. 1 which is a schematic, sectional view of the present invention and FIGS. 2, 3 and 5 which show alternate embodiments of the present invention. The present invention will generally be described with reference to a hydraulic booster for use with the power brake system of a motor vehicle but can be used with hydraulic boosters in other applications.

Referring to FIG. 1, the system consists of pumping means such as power steering pump 11. Fluid is pumped through a hydraulic booster generally shown as 12. The hydraulic booster is divided into two portions, the booster control portion 13 and the gain valve portion 14. The booster control portion contains the operative portion of a hydraulic booster as known in the art, including the control valving and operative pistons. U.S. Pat. No. 3,796,134 shows a typical hydraulic booster with control valving. The gain valve portion 14 contains the gain valve 23 and the pressure limiter 30 of the present invention.

The hydraulic booster operates to cause an increase of pressure in the booster control portion 13 which acts on a braking means such as a master cylinder. This increase of pressure can be caused by the demand or gain valve generally shown at 23. During normal operation when the brake is not used, valve means in the booster control portion 13 close so that no fluid is passing from pump 11 through booster control line 24 into the booster control portion 13. The power steering pump 11 feeds fluid through pump line 25, the gain valve 23, and line 18 to the power steering gear 15, for normal operation of the power steering. The fluid flows from power steering gear 15 through line 19 to a pump reservoir 20 for the pump. When the brake is not applied, the system operates with the power steering fluid circulating as if the hydraulic booster 12 was not in the system.

There is an inlet passage 33 through housing 29 which is connected to pump line 25. The inlet passage 33 is connected to a first chamber 34 within housing 29. The first chamber is located toward the front end 31 of housing 29. Preferably, first chamber 34 is cylindrical having its axia parallel to or along the axis of housing 29. Adjacent to first chamber 34 and connected to it is a second chamber 36 which preferably is also cylindrical and has a common axis with first chamber 34. The second chamber 36 has a greater cross-sectional area than first chamber 34. There is a cylindrical gain valve bore 38 adjacent to second chamber 36 and having a common axis with second chamber 36. Preferably, gain valve bore 38 is cylindrical and has a closed end 39 opposite the second chamber 36. Outlet passage 40 passes from the second chamber through housing 29 wall to line 18.

A gain valve piston 41 is slidingly located within gain valve bore 38 and has a diameter slightly less than gain valve bore 38. Gain valve piston 41 has a front end 42 and a back end 43. There is a suitable sealing means such as O-ring 44 between the inner wall of bore 38 and the gain valve piston located between the front end 42 and the back end 43. O-ring 44 prevents the passage of fluid between the front end 42 and the back end 43 through the space between the gain valve piston 41 and bore 38. The O-ring 44 is shown in an annular channel in the gain valve piston 41.

There is a biasing means such as gain valve spring 47 between the back end 43 of the gain valve piston 41 and the closed end 39 of the gain valve bore 38. Gain valve spring 47 biases gain valve piston 41 toward the first chamber 34. There can be a bore step 50, or other suitable stop, in gain valve bore 38 to prevent movement of gain valve piston 41 to the right.

Booster side inlet 52 passes through the housing 29 into the gain valve bore 38 in the back end chamber formed between the closed end 39 of the gain valve bore 38 and the back end 43 of gain valve piston 41. The booster side inlet 52 is connected through line 53 to the booster control portion 13. There is a stem 55 connected to the front end 42 of gain valve piston 41 parallel to the axis of the gain valve piston 41 and preferably along the axis of the piston 41. The end of the stem 55 opposite the connection to the gain valve piston 41 slidingly passes through a stem hole 56 through front end 31 of the housing. A sealing means such as O-ring 57 is between the stem 55 and the stem hole 56.

The above description is of a gain valve used to illustrate the principle of the present invention and is not intended to limit the present invention. Gain valves known in the art can have some kind of stopping means to prevent the gain valve piston 41 from sliding into first chamber 34 and thereby closing a passage between first chamber 34, second chamber 36 and outlet passage 40 and/or to limit the gain valve gap 59 to limit the pressure.

Booster control portion 13 is activated by the operator stepping on the brake pedal. This opens up valve means within booster control portion 13 so that there is communication through the booster control portion 13, to the gain valve bore 38 between the back end 43 of gain valve piston 41 and the closed end of the bore 38. The areas of the back end 43 of gain valve piston 41 and the front end 42 of gain valve piston 41 are designed so that when booster control portion 13 is actuated, there is a movement to restrict the gain valve gap 59 and thereby increase the system pressure to assist in braking. The pressure from pump 11, in addition to the biasing of gain valve piston 41 toward the first chamber 34 by gain valve spring 47, moves the gain valve piston 41 toward the first chamber 34 restricting the gap 59 between first chamber 34, second chamber 36 and gain valve control piston 41. This restriction causes an increase of pressure from the gap 59 back to pump 11 and through line 24, booster control portion 13, line 53 and into the back end chamber between the back end 43 of piston 41 and the closed end 39 of bore 38.

Figure 4:
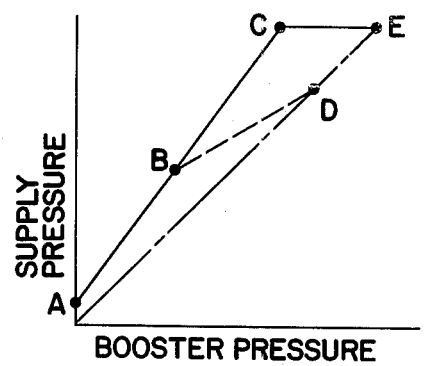
FIG. 4 is an operation curve comparing the supply pump pressure and the booster pressure in a hydraulic booster of the present invention with a hydraulic booster containing a gain valve without the pressure limiter of the present invention.

In the prior art, a physical stop prevents gap 59 from closing so as to maintain an open channel from pump 11 to maintain fluid flowing through power steering gear 15. Pressure is controlled by a pump relief valve. Referring to FIG. 4, the operation of a gain valve without the pressure limiter of the present invention can be followed. The gain valve piston 41 will move to restrict the gap opening 59 until it is stopped. Thus, the curve of supply pump pressure will steadily increase from A to C where C would be the maximum supply pump pressure. At maximum braking, the valve means in the booster control portion 13 remains in open position and the booster pressure will eventually reach the supply pressure in going from C to E.

The present invention is a novel means to control and limit the pressure which can be attained with the gain or demand valve 23. The pressure limiter 30 has a pressure limiter piston 62. It is located to move axially within a piston bore 64 in the back end 43 of gain valve piston 41. The piston bore 64 has a closed end 65 and an open end 66. Axially connected to pressure limiter piston 62 is piston rod 68. Piston rod 68 is connected at one end to pressure limiter piston 62 and passes axially from piston 62, through the back end chamber between the back end 43 of the gain valve piston 41 and then slidingly through piston rod opening 69 in the closed end 39 of the bore 38. There is a sealing means such as O-ring 70 between the piston rod 68 and piston rod opening 69. The O-ring 70 is shown in a channel within piston rod opening 69. The opposite end 72 of piston rod 68 passes into a low or atmospheric pressure vent 73. There is a stop means such as retaining ring 75 between the opposite end 72 of piston rod 68 and the outer wall of the closed end of the housing which defines opening 69. Retaining ring 75 is connected near the end 72 of piston rod 68 and has a greater diameter than piston rod opening 69. The piston rod 68 will be stopped from moving toward the first chamber by the intersection of retaining ring 75 and the outside wall around the opening 69 in the closed end of housing 29.

There is an interlock between piston 62 and the open end 66 of piston bore 64. Preferably, the interlock is a retaining ring 79 connected to the inside wall of the piston bore 64 near the open end 66 of the piston bore 64. The piston 62 intercepts the piston retaining ring 79 when there is a relative movement of the piston 62 and the open end 66 of the piston bore 64 toward each other. There is a spring means such as pressure limiter spring 81 biasing piston 62 in the direction of the first chamber 34. The spring can be around piston rod 68 and between the closed end 39 of bore 38 and piston 62 as shown in FIG. 1.

When the booster control portion 13 is not activated, the hydraulic booster including gain valve 23 and pressure limiter 30 is in a neutral position as shown in FIG. 1. There is a minimum pressure through booster side inlet 52 to the back end chamber. In this position, power steering pump 11 pumps fluid through pump line 25, inlet passage 33, first chamber 34, through gain valve gap 59, second chamber 36, outlet passage 40, line 18, power steering gear 15, line 19, reservoir 20 and then back to power steering pump 11. The valve means in booster control portion 13 are closed so that there is no fluid flow through booster control valve into booster side inlet 52. In this mode, pressure limiter spring 81 is extended and there are little, if any, fluid forces on pressure limiter piston 62 or the back end 43 of gain valve piston 41. The normal pumping pressure from pump 11 maintains gap 59 open as determined by gain valve spring 47 and stop 50 so as to provide circulation from the pump through the gain valve to the power steering gear.

When the brake pedal is actuated by the operator opening the valve means in the booster control portion 13, fluid flows and pressure is exerted through line 24, booster control portion 13, to line 53 and into booster side inlet 52 forcing gain valve piston 41 to the left. The areas of the front end 42 and the back end 43 of gain valve piston 41 are designed considering gain valve spring 47 so there is a net force against the back end of piston 41 biasing the piston 41 toward the first chamber 34. Gap 59 restricts and the pressure between pump and gap 59 increases. The force of the fluid in the back end chamber between the back end 43 of the gain valve piston 41 and the closed end 39 not only tends to move the gain valve piston 41 toward the first chamber 34 but acts against the front end 67 of pressure limiter piston 62 forcing piston 62 away from the first chamber 34 and against pressure limiter spring 81. Initially, the gain valve 23 responds as if there were no pressure limiter portion 30 in the system while gain valve piston 41 moves toward the first chamber 34 and pressure limiter piston 62 moves relative to the gain valve piston toward the closed end 39. The distance through which these two pistons move without interacting is shown as Y. Referring to the curve in FIG. 4, the supply pressure to booster pressure moves from A to B in the same manner as a gain valve without a pressure limiter.

Once the pressure limiter piston 62 intersects with piston retaining ring 79, fluid forces against the back end 43 of piston 41 and the front end 67 of pressure limiter piston 62 act against each other. After the engagement, further movement of the gain valve piston 41 is increasingly restricted by the force against the front end 67 of pressure limiter piston 62 until the gain valve piston 41 ceases to move, the gap 59 becomes minimum and the maximum pressure is achieved. The movement of pressure limiter piston 62 toward closed end 39 is opposed by the gain valve at piston retaining ring 79 and by the pressure limiter spring 81.

FIG. 4 shows that the pressure limiter portion 30 of the present invention does not affect operation between points A and B. The pressure limiter piston 62 interlocks with the gain valve piston 41 at point B. The pressure limiter portion 30 controls the maximum value to point D which is below point E which is the maximum pressure attained without the pressure limiter of the present invention using similar gain valves. In order to obtain the same output force from the booster control portion 13 using the pressure limiter portion 30 of the present invention, either the gain valve portion 14 must be redesigned or the booster control portion must be redesigned. For example, the area of an output piston assembly in the hydraulic booster can be increased to get the same output force at the lower supply pressure of point D.

An alternate and preferred embodiment will be described with reference to FIGS. 2 and 3. Although FIG. 1 shows a desirable embodiment in which the pressure limiter is integrally combined with the gain valve, the inventor prefers the embodiments to be described with reference to FIGS. 2 and 3 because of additional seal, O-ring 70 required and failure of O-ring 70 would result in high pressure fluid leaking past piston rod 68 through piston rod opening 69 and out of the system. In the embodiment shown in FIGS. 2 and 3, a leak past the pressure limiter piston 93 would merely result in fluid flowing into the reservoir 20 and remaining in the system.

FIG. 2 shows the pressure limiter 80 in a mode in which it is not engaged. FIG. 3 shows the pressure limiter acting in a mode where it applies forces to prevent gain valve gap 59' from being closed.

The hydraulic booster 12' shown in FIGS. 2, 3 and 5 is divided into two portions, the booster control portion 13' and the gain valve portion 14'. The hydraulic booster 12' operates with the power steering pump 11', power steering gear 15' in the same manner as the hydraulic booster shown in FIG. 1 and discussed above. The booster control portion 13' operates similarly to the booster control portion described with reference to FIG. 1.

The gain valve portion 14' has a housing 29' which contains the gain valve 23' and the pressure limiter 80. The housing 29' has a front end 87. The gain valve 23' is generally the same type as described with reference to FIG. 1. There is an inlet passage 33' through housing 29' which is connected to pump line 25'. The inlet passage 33' is connected to a first chamber 34' within housing 29'. Preferably, first chamber 34' is cylindrical having its axis parallel to or along the axis of housing 29'. There is a first chamber wall 103 on the front side of the first chamber 34'. Adjacent to first chamber 34' and connected to it is a second chamber 36' which preferably is also cylindrical and has a common axis with first chamber 34'. The second chamber 36' has a greater cross-sectional area than first chamber 34'. There is a cylindrical gain valve bore 38' adjacent to second chamber 36' and having a common axis with second chamber 36'. Preferably, gain valve bore 38' is cylindrical and has a closed end 39' opposite the second chamber 36'. Outlet passage 40' passes from the second chamber through housing 29' wall to line 18'.

A gain valve piston 41' is slidingly located within gain valve bore 38' and has a diameter slightly less than gain valve bore 38'. Gain valve piston 41' has a front end 42' and a back end 43'. There is a suitable sealing means such as O-ring 44' between the inner wall of bore 38' and the gain valve piston located between the front end 42' and the back end 43'. O-ring 44' prevents the passage of fluid between the front end 42' and the back end 43' through the space between the gain valve piston 41' and bore 38'. The O-ring 44' is shown in an annular channel in the gain valve piston 41'.

There is a gain valve spring means such as gain valve spring 47' between the back end 43' of the gain valve piston 41' and the closed end 39' of the gain valve bore 38'. Gain valve spring 47' biases gain valve piston 41' toward the first chamber 34'. There can be a bore step 50', or other suitable stop, in gain valve bore 38' to prevent movement of gain valve piston 41' to the right.

Booster side inlet 52' passes through the housing 29' and back booster passage 97 into the gain valve bore 38' in the back end chamber formed between the closed end 39' of the gain valve bore 38' and the back end 43' of gain valve piston 41'. The booster side inlet 52' is connected through line 53' to the booster control portion 13'. There is a stem 55' connected to the front end 42' of gain valve piston 41' parallel to the axis of the gain valve piston 41' and preferably along the axis of the piston 41'. The end of the stem 55' opposite the connection to the gain valve piston 41' slidingly passes through a stem hole 56' through first chamber wall 103.

The pressure limiter 80 of FIGS. 2, 3, and 5 has a pressure limiter chamber 90 within housing 29'. Preferably, pressure limiter chamber 90 is a bore in which there is a pressure limiter piston 93 which moves axially within the pressure limiter chamber 90. The pressure limiter piston 93 has a front portion 94 and a back portion 95. The front portion 94 communicates with a line 96 to pump line 25' from the power steering pump 11'. Preferably, front portion 94 extends in a sliding relationship into a bore 98, bore 98 being connected to line 96, through which can be fed fluid under pressure from pump 11'. There is preferably a sealing means between the sidewall of piston 93 and bore 98 which seals the front portion 94 within bore 98 from the back portion 95 such as O-ring 99 or labyrinth seals which are a plurality of grooves which trap fluid and minimize the effects of frictional force. A biasing means such as pressure limiter spring 101 biases piston 93 toward the front end 87 of the pressure limiter housing portion 84 and into bore 98. Spring 101 extends between extension 102 on piston 93 and a stop means such as a nonmovable bushing or first chamber wall 103 in the back end of pressure limiter chamber 90. Gain valve stem 55' extends through stem hole 56' and axially into chamber 90. Pressure limiter chamber 90 communicates to the low pressure reservoir 20', through passage 108 and line 109.

Referring to FIG. 2, the pressure limiter 80 is shown in a position when there is no braking action through booster control portion 13' or any braking action is not involving the pressure limiter. In this mode, the pressure limiter is biased toward the front end 87 of pressure limiter housing portion 84. There is suitable means to stop the piston 93, such means can be a stop within bore 98 or an extension 102 intersecting with the wall surrounding bore 98. Spring 101 is designed to be fully extended in this mode. When the brake is actuated at low pressures, gap 59' in the gain valve becomes restricted and the pressure in the system between gap 59' and the power steering pump 11' increases accordingly. Line 96 transmits this pressure to the front portion of pressure limiter piston 93 forcing it toward the right against spring 101. At the same time, the gain valve piston 41' is moving toward the left thereby moving gain valve stem 55' toward the left. As discussed in the earlier embodiments, the gain valve will behave normally until the stem 55' and back end 95 of the pressure limiter piston 93 moves through a distance Y' towards each other.

The pressure limiting device is activated by the intersection of the gain valve stem 55' and the back end 95 of pressure limiter piston 93. The operation is analogous to the embodiment shown in FIG. 1 and described above. Spring 101 is sized so that the forces of the fluid against the front end 94 of pressure limiting piston 93, and the force through the booster control portion 13' on the back end 43' of gain valve piston 41' forcing stem 55' against the back portion 95 of the pressure limiter piston 93, in addition to the effects of the gain valve spring, cause the gain valve piston 41' to stop moving at a predetermined pressure, thereby achieving a desired pressure limit between the power steering pump and the gain valve gap and maintaining flow through the gain valve 23' to the power steering gear 15'.

The embodiment of pressure limiter 80' in FIG. 5 is similar to that of FIGS. 2 and 3 but has a differently shaped pressure limiter piston 93' having a front portion 105 and a back portion 106. The front portion 105 is a piston disc which is slidingly located in pressure limiter chamber 90'. The back portion 106 is a pressure limiter stem having a common axis with gain valve stem 55" and directed toward the gain valve stem 55".

The pressure limiter 80' shown in FIG. 5 is engaged with the gain valve 41" at gain valve stem 55'. Pressure limiter spring 101' between first chamber wall 103' and front portion 105 forces the pressure limiter piston 93' toward the front 87' of the housing 29". When the gain valve 23" is not increasing the pressure in the hydraulic booster, the front portion 94 of the pressure limiter piston is forced against wall 107' of pressure limiter chamber 90'. There is a pressure limiter bore 98' through the wall 103' so that system pressure through line 96' to bore 98' forces the pressure limiter piston 93' toward the gain valve piston 41" during power assist operation. The operation of the pressure limiter of FIG. 5, except for minor differences resulting from piston design, is the same as the operation of the pressure limiter of FIGS. 2 and 3.

The use of the pressure limiter of the present invention controls the maximum pressure to a predetermined value based on pressure values alone for any composition fluid at any temperature. This is unlike prior art pressure limiters which limit the pressure based on a predetermined geometric gap to create a pressure difference for a specific fluid at specific conditions without compensating for variability of composition or temperature. The gap in the pressure limiter of the present invention is determined by the system forces and does not require the narrow tolerances of prior art pressure limiters which create a predetermined size gap.

Modifications, changes, and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein but rather should be limited by the advance at which the invention has promoted the art.

What is claimed is:

1. A pressure limiter for a hydraulic booster, comprising:
   (a) a housing having, (I) a front end in opposed relation to a closed back end, (II) a first chamber adjacent the front end and extending longitudinally of the housing therefrom towards the closed back end, the first chamber having a fluid inlet through which fluid enters the first chamber, (III) a second chamber communicating with the first chamber in coaxial alignment and extending therefrom in the direction of the closed back end of the housing and having a greater cross-sectional area than that of the first chamber, the second chamber having a fluid outlet through which fluid exits the second chamber, and (IV) a gain valve bore communicating with the second chamber in coaxial alignment and extending therefrom in the direction of the closed back end of the housing;
   (b) a gain valve piston slideably mounted in the gain valve bore and extending into the second chamber and being reciprocable in the bore and second chamber, the piston capable of sealing the first chamber from the second chamber to block the flow of fluid between the fluid inlet and the fluid outlet, as the piston approaches and abuts the first chamber;
   (c) a second fluid inlet in the housing in communication with the gain valve bore and through which fluid, under pressure, enters the housing and engages and moves the gain valve piston towards the front end of the housing to seal the first chamber from the second chamber;
   (d) means for biasing the gain valve piston in the direction of the first chamber; and
   (e) means, operable by fluid under pressure, for engaging the gain valve piston and preventing the gain valve piston from abuting and sealing the first chamber to block the flow of fluid between the fluid inlet and outlet, said gain valve piston engaging means including, (I) a separate pressure limiter piston reciprocable in a bore that is separate from the bore of the gain valve piston from sealing the first chamber from the second chamber, and (II) means for biassing the pressure limiter piston in the direction of the front end of the housing.

2. The pressure limiter, as recited in claim 1, wherein the gain valve piston has a front end closer the front end of the housing and a back end closer the closed back end of the housing, and wherein the bore of the pressure limiter piston is disposed in the back end of the gain valve piston and extends longitudinally of said piston from the back and thereof towards the front and thereof, and wherein the closed back end of the housing has an opening extending longitudinally therethrough, and wherein the means for engaging the gain valve piston and preventing the movement thereof toward the first chamber includes:
   (I) a piston rod extending coaxially from the pressure limiter piston through the opening in the closed back end of the housing;
   (II) means coacting between the piston rod and closed back end for sealing the space between the rod and walls of the housing defining the opening; and
   (III) stop means coacting with the rod to stop movement of the pressure limiter piston towards the first chamber; and
   (IV) an interlock means extending into the bore of the pressure limiter piston adjacent the back end of the gain valve piston to restrict said bore and maintain the pressure limiter piston in said bore;
   and which pressure limiter includes a booster side inlet passageway disposed in the housing between the back end of the piston and the closed end of the housing.

3. The pressure limiter as recited in claim 2 further comprising a back end chamber between the back end of the piston and the closed end of the housing, the booster side inlet passing through the housing into the back end chamber.

4. The pressure limiter as recited in claim 3 wherein the biassing means for biassing the pressure limiter piston includes a spring around the piston rod between the closed end of the housing and the pressure limiter piston.

5. The pressure limiter as recited in claim 4 wherein the end of the piston rod extends through the housing and the stop means is a piston retaining ring connected near the opposite end of the piston rod, the retaining ring having a greater diameter than the opening in the closed end of the housing whereby the piston rod is stopped from moving toward the first chamber by the intersection of the retaining ring and the outside wall around the opening in the closed end of the housing.

6. The pressure limiter as recited in claim 4 wherein the interlock means is a retaining ring connected to the inside wall of the gain valve piston bore and near the open end of the gain valve piston bore, whereby the piston intercepts the retaining ring when there is relative movement of the pressure limiter piston and the open end of the pressure limiter piston bore toward each other.

7. The pressure limiter as recited in claim 6 wherein there is a distance Y between the facing edges of the pressure limiter piston and retaining ring when there is a minimum pressure in the back end chamber.

8. The pressure limiter as recited in claim 6 wherein the pressure limiter piston and the piston retaining ring intercept when there is sufficient pressure in the back end chamber to slide the gain valve piston toward the front end of the housing and the pressure limiter piston toward the open end of the pressure limiter bore, there being a gap between the first chamber, the second chamber and the front end of the gain valve piston whereby the fluid pressure of fluid flowing from front inlet passage, through the gap to the outlet passage does not exceed a predetermined value.

9. A pressure limiter as recited in claim 4 further comprising a stem axially connected to the front end of the gain valve piston, the stem slidingly passing through a stem hole in the front end of the housing.

10. The pressure limiter, as recited in claim 1, wherein the bore of the pressure limiter piston includes a pressure limiter chamber which is disposed within the housing between the first chamber and front end of the housing and which is coaxially aligned with the first chamber and separated therefrom by a wall having an opening extending therethrough, the pressure limiter piston having a front portion and a back portion;

and which pressure limiter includes:
   (I) a stem extending from the gain valve piston through the first chamber and opening in a wall into the pressure limiter chamber for contact with the pressure limiter piston when the pressure limiter piston moves a certain distance towards the first chamber; and
   (II) means coacting with the pressure limiter piston for stopping movement of said piston toward the front end of the housing.

11. The pressure limiter as recited in claim 10 wherein the front portion of the pressure limiter piston is located to slide within the bore through the front end, further comprising a means to stop the front portion of the pressure limiter piston from sliding into the bore.

12. The pressure limiter as recited in claim 11 wherein the means to stop is an extension from the pressure limiter piston sidewall between the front portion and the back portion.

13. The pressure limiter as recited in claim 12 wherein the biasing means is a spring between the extension and the first chamber wall.

14. A pressure limiter for a hydraulic booster comprising:
   (a) a housing having at least three coaxially aligned chambers, the second chamber between the first and third chambers having a larger diameter than the other two chambers, the first chamber having a fluid inlet passageway and the second chamber having a fluid outlet passageway;
   (b) a gain valve reciprocable in the third chamber and extending into the second chamber and forming with the second chamber an annular opening through which fluid passes between the fluid passageway, the annular opening becomming smaller as the valve moves toward the first chamber and being capable of being closed when the valve abuts the first chamber;
   (c) a fluid inlet in the housing and communicating with the third chamber and through which fluid, under pressure, enters the housing and engages and moves the gain valve towards the first chamber to close the annular opening; and
   (d) means operable by fluid, under pressure, for engaging the valve and preventing the movement thereof towards the first chamber beyond a position where the valve is in spaced relation from the first chamber to prevent closure of the annular opening.

15. The pressure limiter of claim 14, wherein the gain valve has a pair of opposing ends, and the means includes:
   (d) a fourth chamber in the end of the valve farthest from the first chamber;
   (e) a piston reciprocable in the fourth chamber;
   (f) means for maintaining the piston within the fourth chamber; and
   (g) means for biasing the piston in the direction of the first chamber.

16. The pressure limiter of claim 15, which includes means for biasing the gain valve in the direction of the first chamber independently of the piston.

17. The pressure limiter of claim 16, which includes a fifth cylindrical chamber which is coaxially aligned and communicates with the fourth chamber, the fifth chamber being farthest spaced from the first chamber and including a fluid inlet passageway through which fluid enters the fourth and fifth chambers, the area of the piston closest the first chamber being greater than the area of the piston closest the fifth chamber, such that fluid, under pressure, within the fourth chamber acts to move the piston in a direction away from the first chamber.

18. The pressure limiter of claim 17, wherein the means for maintaining the piston in the fourth chamber includes an annular ring projecting into the fourth chamber adjacent the fifth chamber.

19. The pressure limiter of claim 14, wherein the means includes:
   (d) a fourth chamber coaxially aligned with the first chamber and spaced therefrom and out of communication therewith, the fourth chamber being farther spaced from the second chamber than the first chamber, the fourth chamber including an inlet through which fluid, under pressure, passes into the fourth chamber;
   (e) a piston disposed in the fourth chamber and reciprocable along the longitudinal axis thereof;
   (f) means for biasing the piston in a direction away from the first chamber; and
   (g) means carried by the valve and extending into the fourth chamber for engaging the piston when the piston moves a predetermined distance in the fourth chamber towards the valve, to maintain the valve in predetermined spaced relation from the first chamber.

20. The pressure limiter of claim 19, which includes means for biasing the valve in the direction of the first chamber.

21. The pressure limiter of claim 20, wherein the means carried by the valve for contacting the piston includes, a rod coaxially affixed to the valve and extending therefrom through the first chamber into the fourth chamber.

* * * * *